US005382767A

United States Patent [19]

Takano et al.

[11] Patent Number: 5,382,767

[45] Date of Patent: Jan. 17, 1995

[54] PUSH-BUTTON SWITCHES

[75] Inventors: Tsunesuke Takano; Kouichi Sinzawa, both of Tokyo, Japan

[73] Assignee: Daiichi Denso Buhin Co., Ltd., Japan

[21] Appl. No.: 144,027

[22] Filed: Nov. 1, 1993

[30] Foreign Application Priority Data

Nov. 12, 1992 [JP] Japan ............................ 4-084254[U]
May 14, 1993 [JP] Japan ............................ 5-030504[U]

[51] Int. Cl.[6] ............................................ H01M 13/12

[52] U.S. Cl. .................................... 200/531; 200/530; 200/536; 200/302.002

[58] Field of Search ............... 200/531, 530, 536, 532, 200/252, 257, 260, 345, 520, 341, 302.2

[56] References Cited

U.S. PATENT DOCUMENTS

| | | | |
|---|---|---|---|
| 3,239,637 | 3/1966 | Pierce | 200/531 |
| 4,766,272 | 8/1988 | Guzzon | 200/531 |
| 5,008,505 | 4/1991 | Takano et al. | 200/531 |

FOREIGN PATENT DOCUMENTS

| | | | |
|---|---|---|---|
| 2601206 | 7/1977 | Germany | 200/531 |

*Primary Examiner*—Henry J. Recla
*Assistant Examiner*—David J. Walczak
*Attorney, Agent, or Firm*—Nixon & Vanderhye

[57] ABSTRACT

Push-button switches include a housing which defines an interior space and an opposed pair of longitudinally oriented recessed channels. At least upper regions of the recessed channels are open to said defined interior space. A pair of elongate fixed contact strips are each positioned within a respective one of the defined recessed channels, the fixed contact strips being of a sufficient length so that a terminal end portion thereof is disposed in the open upper region of the recessed channel to thereby be exposed to the interior space of the housing. In this regard, the housing preferably includes interior cover walls covering a major extent of the recessed channels so that the terminal end portions of the fixed contact strips positioned therewithin are exposed to the defined housing interior space. A push-button assembly is received within the interior space of the housing for reciprocal movements between extended and retracted positions, with a spring urging the push-button assembly into the extended position. The push button assembly includes a slide contact member which is movable with the push-button assembly between the extended and retracted positions thereof. The slide contact member has a pair of resilient contact legs each contacting a respective one of the exposed terminal end portions of the fixed contact strips when the push-button assembly is in the extended position, whereby an electrical circuit is made, and is spaced from the respective one of the fixed contact strips when the push-button assembly is in the retracted position, whereby an electrical circuit is broken.

20 Claims, 10 Drawing Sheets

PUSH-BUTTON SWITCHES

CROSS-REFERENCE TO RELATED PATENTS

This application is related to commonly owned U.S. Pat. No. 5,201,410 which issued on Apr. 13, 1993 in the name of Tstmesuke Takano et al, and is entitled "Push-Button Switches", the entire content of the same being expressly incorporated hereinto by reference.

FIELD OF INVENTION

The present invention is related to the field of spring-biased push-button switches that serve to make and break an electrical circuit (e.g., such as a lamp which illuminates in response to an open door and/or hatch of an automobile). In preferred forms, the present invention is embodied in structures which facilitate ease of assembly and thus are conducive to assembly by automated means (e.g., assembly robots).

BACKGROUND OF THE INVENTION

Examples of prior push-button switches are disclosed in the above-referenced U.S. Pat. No. 5,201,410 (hereinafter "the '410 patent"). In this regard, the push-button switches of the '410 patent include a housing having opposed pairs of side walls defining an interior space, and an opposed pair of fixed contact members. A push-button assembly is received within the interior space of the housing for reciprocal movements between extended and retracted positions. The push-button assembly includes a pair of opposed side windows having lower extents established by a bridge wall. A spring exerts a bias force to move the push-button assembly into its extended position.

A generally inverted V-shaped slide contact member is movable with the push-button assembly between its extended and retracted positions, and includes a pair of resilient legs each having an outwardly curved contact region. The contact regions serve to contact the pair of fixed contact members when the push-button assembly is moved into one of its extended and retracted positions whereby an electrical circuit is made, and breaks contact with at least one of the fixed pair of contacts when the push-button assembly is moved into the other of its extended and retracted positions, whereby an electrical circuit is broken. The slide contact member further includes terminal end flanges extending from the curved contact regions, the terminal end flanges being positioned so as to contact a respective bridge wall of an associated side window and thereby limit the extent of outward resilient displacement of the legs of the slide contact member.

Although the prior push-button switch as described above exhibits many desirable attributes, there have still been problems in assembly of some component parts, namely the fixed contact members and the spring. In this regard, it will be noted in the '410 patent that the fixed contact members are asymmetrical—that is, one generally L-shaped and one generally planar fixed contact members are provided. By virtue of this asymmetry, therefore, automated operations (e.g., the press-fit mounting of both fixed contact members within the housing) are made more complex and difficult. Furthermore, the coiled diameter of the bias spring is substantially less as compared to the diameter of the interior housing space in which it is received. As a result, the spring has a tendency to twist and/or bend into undesirable shapes during assembly of the switch components thereby raising the possibility of assembly errors causing defective switches to be produced.

It is a principal object of this invention, therefore, to provide push-button switch structures which remedy the problems noted above. Therefore, broadly, the present invention relates to novel spring-biased push-button switches having component structures which facilitates ease of assembly and thus are conducive to assembly by automated means (e.g., assembly robots).

SUMMARY OF THE INVENTION

The push-button switches according to this invention include a generally tubular (preferably generally cylindrical) electrically insulating housing which defines an interior space for receiving therewithin a push-button assembly which is movable between extended and retracted positions. The push-button assembly is itself comprised of a push-button member and a slide contact member. The slide contact member has a pair of resilient contact arms extending downwardly from the slide contact base. Thus, as the push-button assembly moves between its extended and retracted positions, the slide contact member carded thereby will likewise move within the housing's defined interior space.

The housing also defines a pair of longitudinally oriented, elongate opposed recessed channels. A pair of planar fixed contact strips are each positioned within a respective one of the recessed channels. According to the present invention, at least the upper end region of each recessed channel is open to the interior space. Furthermore, each of the fixed contact strips is of a sufficient length so as to extend to the open upper end region of the respective recessed channel in which it is disposed. As a consequence, at least the upper terminal ends of each fixed contact strip will be exposed to make electrical contact with the contact arms of the slide contact so as to make an external circuit (e.g., an interior lamp circuit for an automobile).

Preferably, the housing is provided with interior cover walls each of which covers a major longitudinal extent of a respective recessed channel. A slot is thereby defined by the recessed channel and its associated cover wall so as to accept the fixed contact strip therein. The upper edge of the cover walls are most preferably beveled so as to provide a smooth transition for the resilient contact arms as they move downwardly within the interior space of the housing in response to movement of the push-button assembly from its extended and retracted position. When the push-button assembly is in its retracted position, therefore, the resilient contact arms will be in contact with the electrically insulating cover walls and will thereby be spaced from their respective fixed contact member thereby breaking electrical contact therewith.

The housing is also provided with spring support structures which serve to support the spring so that it acts upon the push-button member. According to one embodiment of this invention, the spring support structure is in the form of a bottom wall which is recessed from the bottom of the housing so as to define a pocket to accommodate the lower clamp ends of the fixed contact strips. The bottom wall may be provided with a transverse depending divider wall which serves to subdivide the defined pocket into respective subpockets for each of the lower clamp ends of the fixed contact strips. As such, the lower clamp ends of the fixed contact strips are effectively isolated from one another, and are protected against mechanical stresses thereby providing a more reliable electrical connection with lead wires associated with the circuit in which the switch is placed.

These and other advantages of this invention will become more clear after careful consideration is given to the following detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various FIGURES denote like structural elements and wherein.

DETAILED DESCRIPTION OF THE PREFERRED EXEMPLARY EMBODIMENTS

Figure 1:
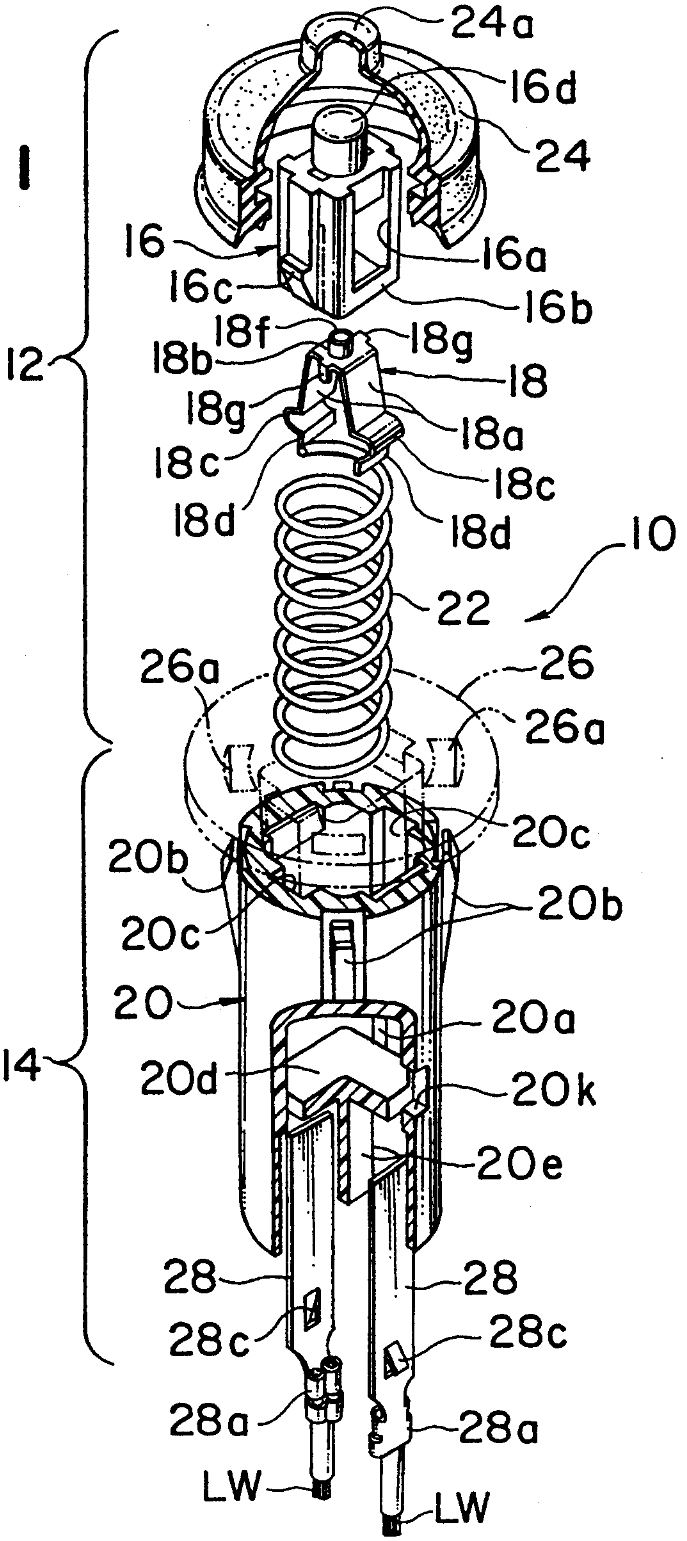
FIG. 1 is an exploded perspective view of an exemplary spring-biased push-button switch according to this invention.
Figure 2:
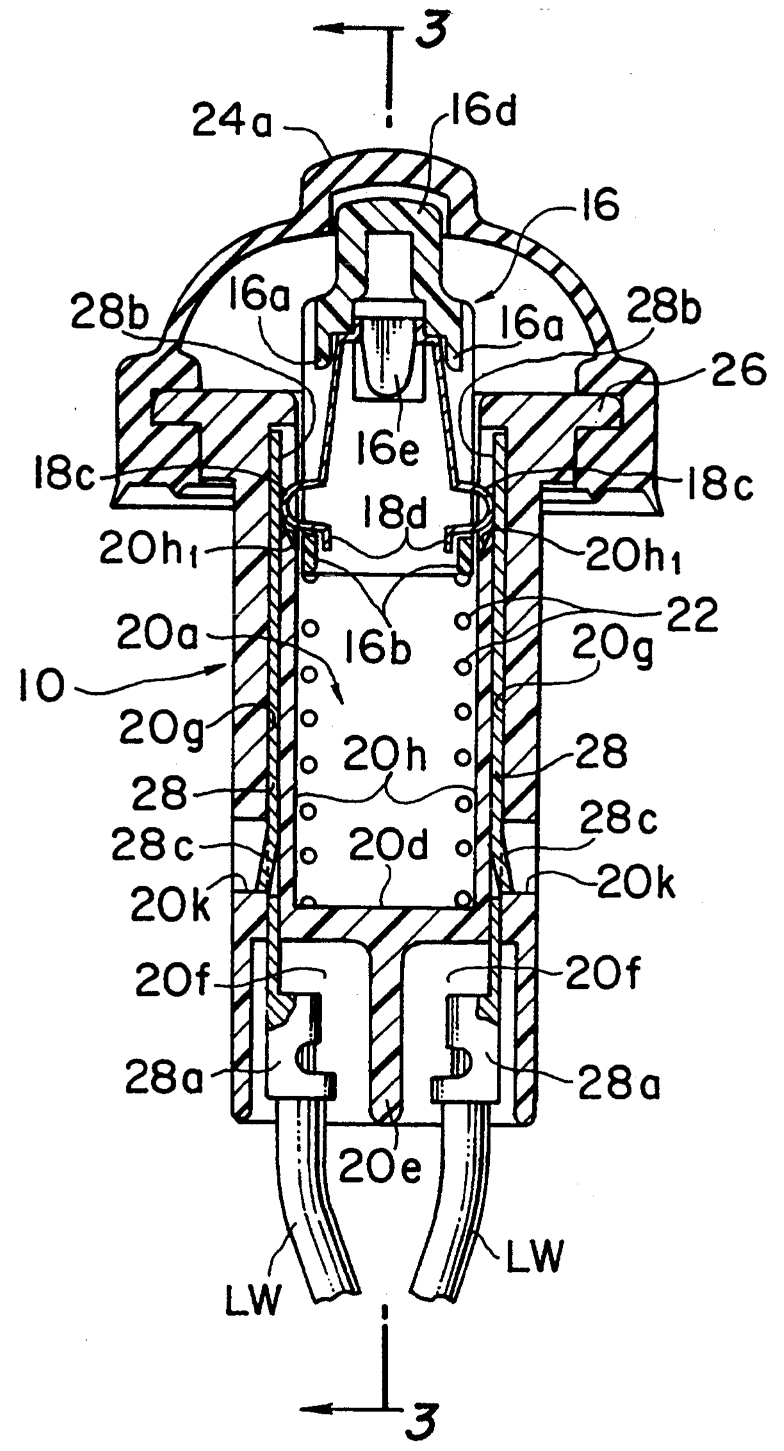
FIG. 2 is a cross-sectional elevational view of the push-button switch shown in FIG. 1.
Figure 3:
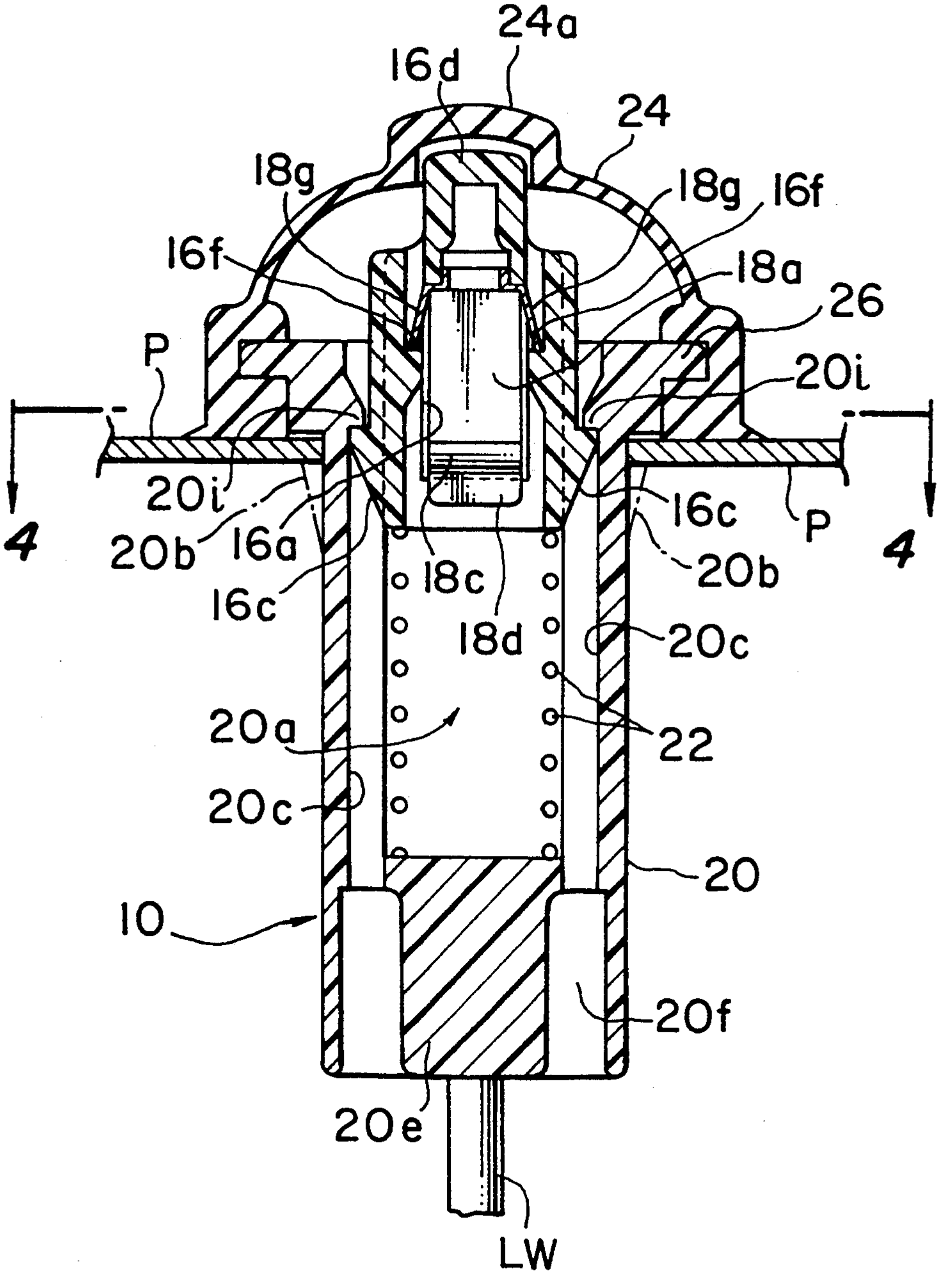
FIG. 3 is a cross-sectional elevational view of the push-button switch shown in FIG. 2 as taken along line 3—3 therein.
Figure 4:
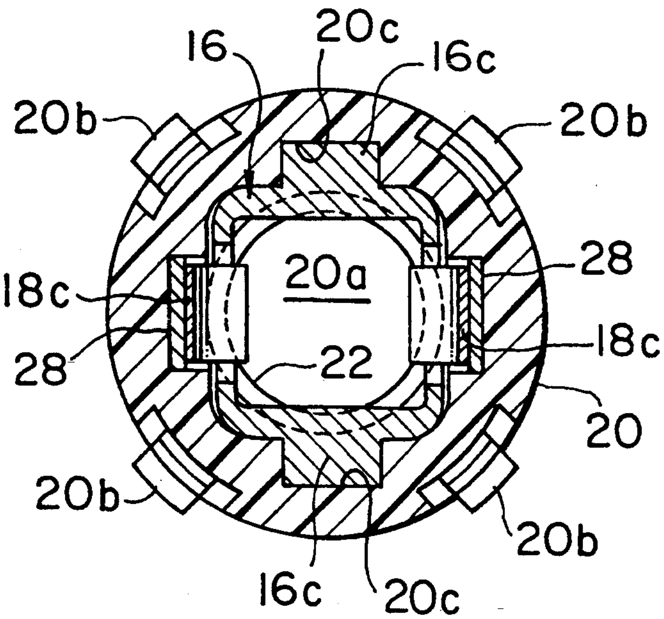
FIG. 4 is a cross-sectional plan view of the push-button switch shown in FIG. 3 as taken along line 4—4 therein.
Figure 5:
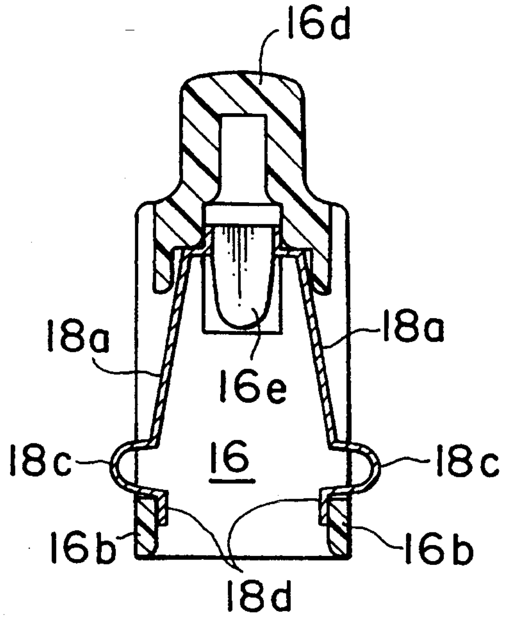
FIG. 5 is a detailed cross-sectional view of the push-button assembly employed in the push-button switch depicted in FIGS. 1–4.

A particularly preferred embodiment of a push-button switch 10 is depicted in accompanying FIGS. 1–7. As is seen from FIG. 1, for example, the push-button switch 10 is generally comprised of a push-button assembly 12 and a housing assembly 14. The push-button assembly 12 is itself comprised of a push-button member 16 which carries a slide contact member 18 within the interior space 20*a* defined by the generally tubular electrically insulating housing 20. The push-button assembly 12 is, moreover, received within the housing interior space 20*a* so as to be reciprocally movable between extended and retracted positions (i.e., in the embodiment shown, so as to make and break and external electrical circuit, respectively).

A compression spring 22 or like biasing means preferably urges the push-button assembly 12 into its extended position. In this regard, it will be observed that the coiled diameter of spring 22 is just slightly less then the nominal interior diameter of the housing 20 (see FIGS. 2–3). As a result, twisting and/or distortion of the spring 22 during assembly is minimized.

A resilient elastomeric cap 24 is preferably attached to the upper collar flange 26 (shown in phantom line in FIG. 1 for ease of presentation) of housing 20 so as to protect the internal components of switch 10 from the ambient conditions of use. In this regard,, the collar flange 26 most preferably has apertures 26*a* defined therein so as to receive mounting posts (not shown) associated with the substrate plate P (see FIG. 3) to which the switch 10 is mounted for use. A number of resilient clamp fingers 20*b* are provided on the exterior periphery of the housing 20 so as that the plate P is captured between the collar flange 26 and clamp fingers 20*b* thereby positionally mount the switch 10.

The push-button member 16 most preferably has a generally rectangular cross-section and defines windows 16*a* in an opposed pair of its sidewalls. The lower extent of these windows 16*a* is established by transverse bridge walls 16*b*. A pair of guide flanges 16*c* are provided on the other opposed sidewalls of the push-button member 16. The guide flanges 16*c* are, moreover, aligned with respective longitudinal guide grooves 20*c* defined in the interior of housing 20 and serve to prevent rotation of the push-button member 16 within the interior space 20*a* of the housing 20 and to guide the push-button member 16 during its reciprocal movements between the extended and retracted positions thereof. An upwardly protruding actuator nipple 16*d* is covered by a correspondingly configured cap 24*a* of the elastomeric cover 24.

The slide contact member 18 includes a pair of downwardly bent resilient contact arms 18*a* joined to a base plate 18*b*. Each of the contact arms 18*a* most preferably includes an outwardly curved contact region 18*c* which terminates in a terminal end flange 18*d*. When positioned within the interior of the push-button member 16, the curved contact regions 18*c* will protrude outwardly through respective ones of the windows 16*a*, while the terminal end flanges 18*d* will serve to limit the extent of outward displacement of the contact arms 18*a* by virtue of contact with the bridge walls 16*b*.

As noted briefly above, the slide contact member 18 is retained within and carried by the push-button member 16. In order to facilitate assembly of these two structures, the slide contact member is provided with an annular raised collar 18*f* associated with the base plate 18*b* which is sized so as to closely surround an interior guide post 16*e* of the push-button member 16 (see FIGS. 2 and 5). Furthermore, the base plate 18*b* is provided with resilient downwardly oriented mounting ears 18*g* which seat against a respective retaining ledge 16*f* formed in the interior of the push-button member 16 (see FIG. 3). Thus, during assembly, the coaxial alignment of the collar 18*f*/guide post 16*e* will serve to positionally guide the slide contact member 18 during insertion into the push-button member 16. Once the slide contact member 18 has been inserted to a sufficient extent, the mounting ears 18*g* will snap outwardly due to their inherent resiliency and thereby seat with a respective retaining flange 16*f*. As a consequence, the slide contact member 18 is coupled within the push-button member 16.

The housing 20 is most preferably formed as a one-piece molded structure. In this regard, the housing 20 will, according to the embodiment shown in FIGS. 1–7, be provided with an integral bottom wall 20*d* which is recessed relative to the bottom end of the housing 20.

The bottom wall 20d is also preferably provided with a depending integral transverse divider wall 20e which defines subpockets 20f for accommodating the lower clamp ends 28a of the fixed contact strips 28. As a result of the placement of the lower damp ends 28a within the subpockets 20f, the electrical connection with lead wires LW will be reliably maintained since the subpockets 20f will provide a measure of protection against mechanical stress.

Important to the present invention, the interior of the housing 20 is provided with an opposed pair of longitudinally oriented (i.e., relative to the elongate axis of the housing 20) recessed channels 20g each of which is sized and configured to accept therein a respective fixed contact strip 28. A pair of cover walls 20h each cover a respective one of the recessed channels 20g along a major longitudinal extent thereof such that the upper ends of each channel 20g are open to the interior space 20a of housing 20. These cover walls 20h are, moreover, spaced from the bottoms of the recessed channels 20g so as to establish a slot which is sized and configured to receive a respective one of the fixed contact members 28 (see, for example, FIG. 2). The upper edges 20h$_1$ of the cover walls 20h are most preferably beveled so as to provide as ramped surface for the curved contact regions 18c as they travel along with the push-button member 16 during movements between the extended and retracted positions and thereby facilitate smooth operation of the switch 10.

The fixed contact strips 28 are provided with outwardly directed resilient locking tabs 28c which extend into an associated aperture 20k defined in the housing 20. Thus, insertion of the fixed contact strips 28 into the slot defined by the recessed channels 20g/cover walls 20h during assembly will be permitted due to the downward slant of the tabs 28c. However, when the fixed contact strips 28 have been inserted sufficiently for the locking tabs 28c to be in registry with their associated aperture 20k, they will spring outwardly thereinto under the influence of their inherent resiliency thereby positionally locking the fixed contact strips 28 within the housing 20.

Figure 6:
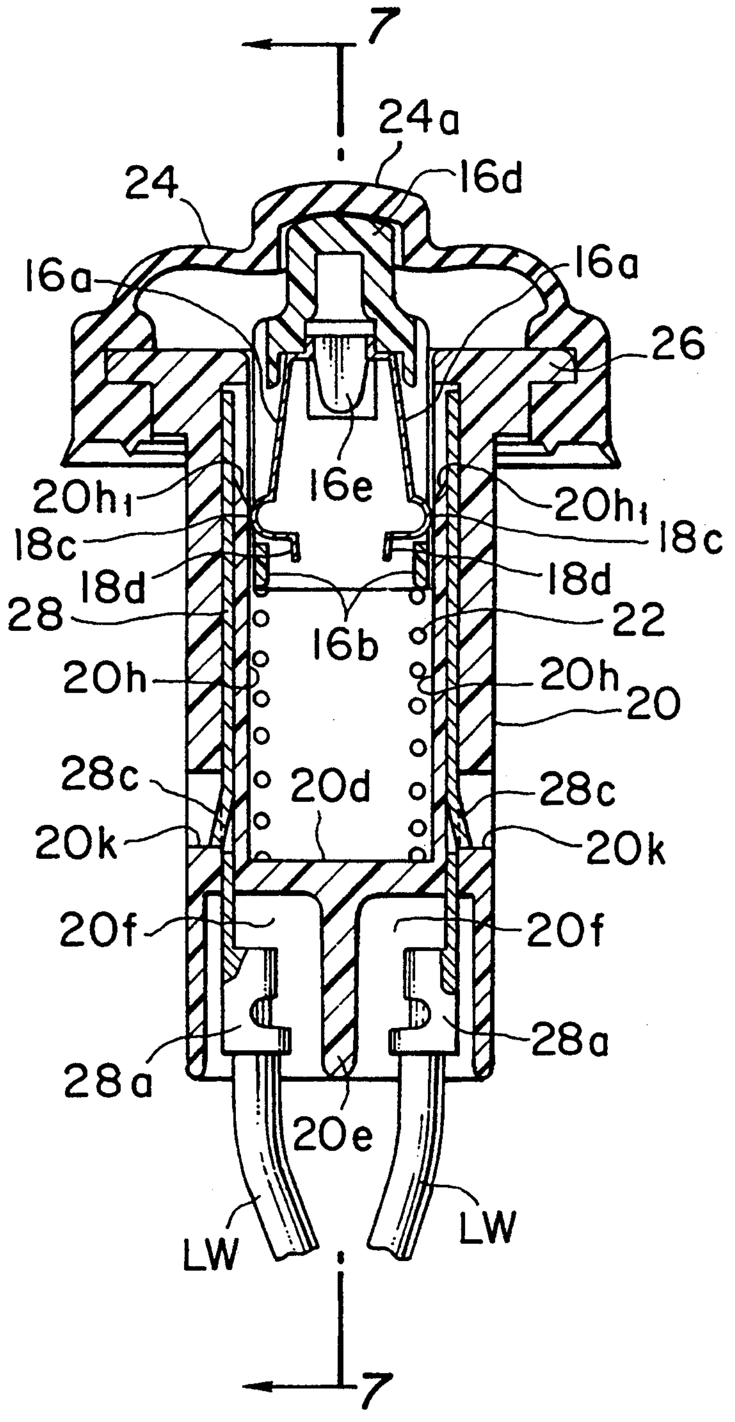
FIGS. 6 and 7 are cross-sectional elevational views of the push-button switch similar to that shown in FIGS. 2 and 3, respectively, but depicted in a state whereby the push-button assembly is in its retracted position.
Figure 7:
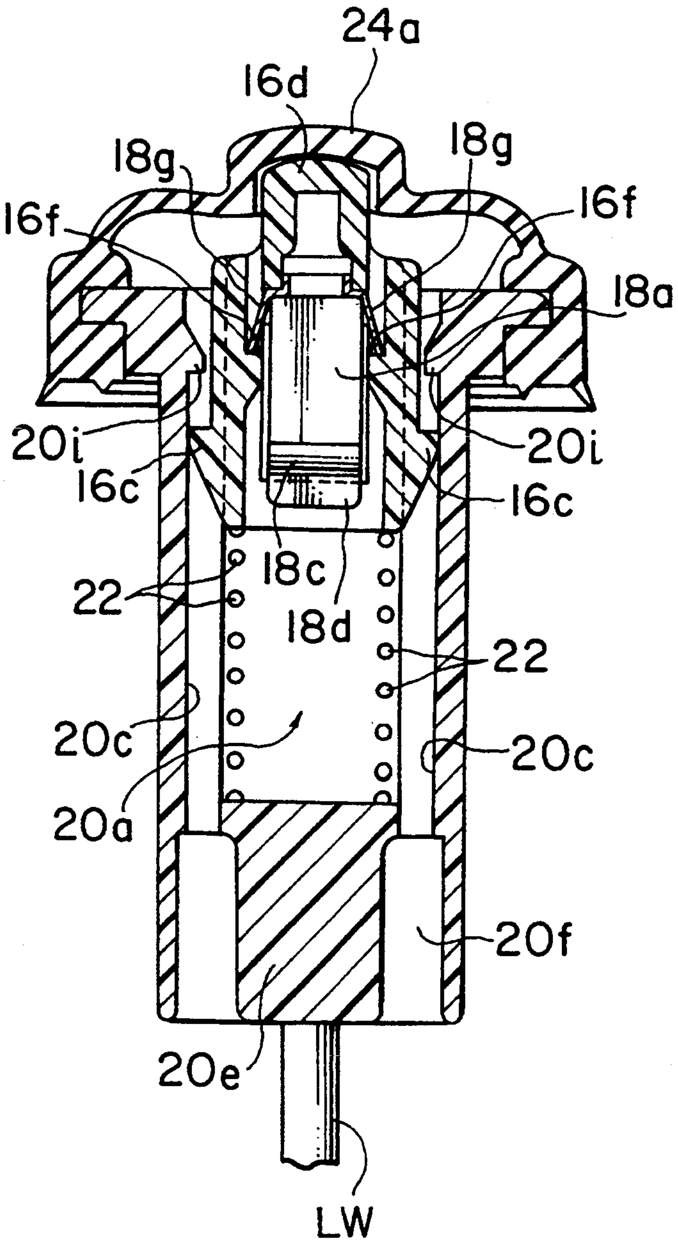

The uppermost extent of travel by the push-button member 16 is established by a pair of inwardly protruding stops 20i defined on an interior portion of the collar 26 of housing 20. That is, the guide flanges 16c of the push-button member 16 will come into contact with the stops 20i under biased influence of the spring 22 and thereby be prevented from further upward travel. Thus, the contact between the stops 20i and the guide flanges 16c establish the extended position of the push-button assembly 12. However, in response to a downward force being applied against the nipple 16d, the entire push-button assembly 12 will be forced to retract into the interior space 20a of the housing 10. Such a state is shown in FIGS. 6–7. As a result, the curved contact regions 16c will ride up onto the cover walls 20h (guided during such movement by the beveled edges 20h$_1$ thereof) so as to be spaced from the fixed contact strips 28 and separated from the exposed ends thereof so as to break an electrical circuit. Of course release of such downward force will allow the push-button assembly 12 to return to its extended position by virtue of the upward bias provided by the spring 22.

Figure 8:
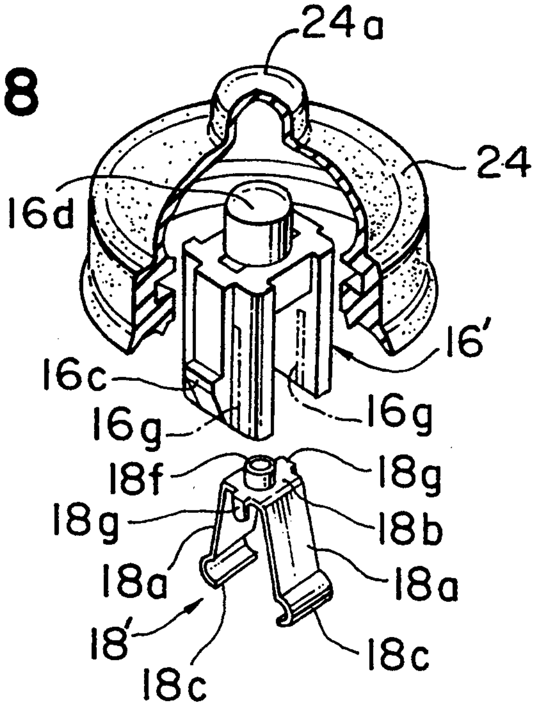
FIG. 8 is an exploded perspective view of an alternative push-button assembly which may be employed in the switches of this invention.
Figure 9:
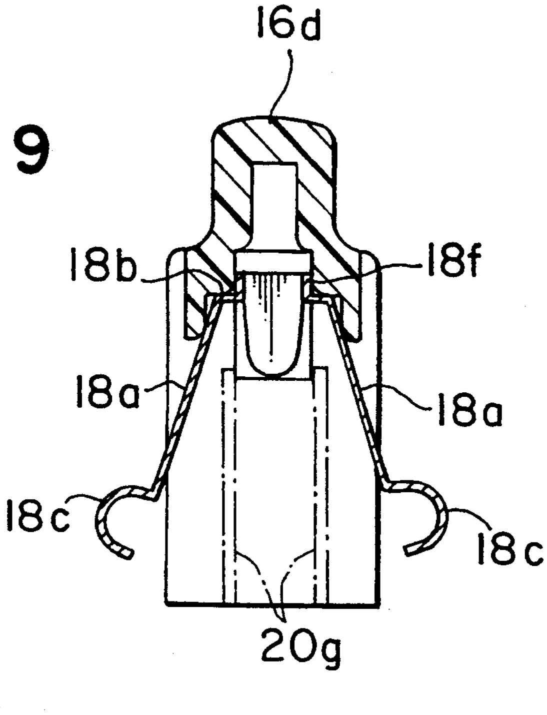
FIG. 9 is an enlarged cross-sectional elevational view of the push-button assembly depicted in FIG. 8.

Accompanying FIGS. 8 and 9 show an alternative push-button member 16' and slide contact member 18' that may be employed in the switch 10 discussed previously. As can be seen the push-button member 16' is essentially identical to the push-button member 16 discussed previously, with the principal exception being that no bridge walls 16b are present. Furthermore, slits 16g may be formed in the sidewalls of the push-button member 16 adjacent to the guide flanges 16c so as to improve the flanges' resiliency and thereby facilitate initial insertion of the push-button member 16' into the interior space 20a of housing 20. Since no bridge walls 16b are provided, it will be noted that the terminal end flanges 18d are absent from the slide contact member 18' shown in FIGS. 8–9.

Figure 10:
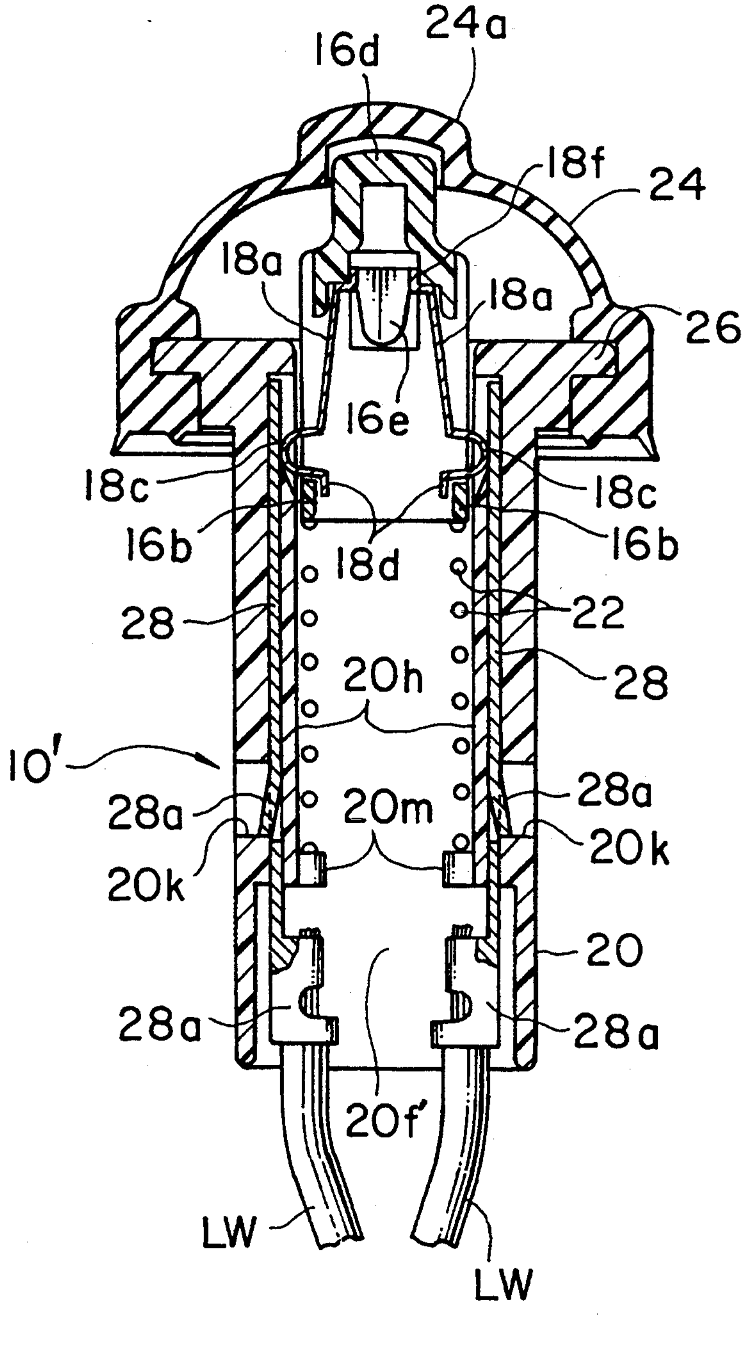
FIG. 10 is a cross-sectional elevational view of another embodiment of a push-button switch according to this invention.

The slide switch 10' shown in accompanying FIG. 10 is substantially identical to the slide switch 10 discussed above. However, instead of a bottom wall 20d, the housing 20 is provided with inwardly protruding lugs 20m which are recessed relative to the bottom end of the housing 20 to thereby establish a single pocket 20f for accommodating the clamp ends 28a of the fixed contact member 28. Like the bottom wall 20d, the lugs 20m provide a support platform for the spring 22.

Figure 11:
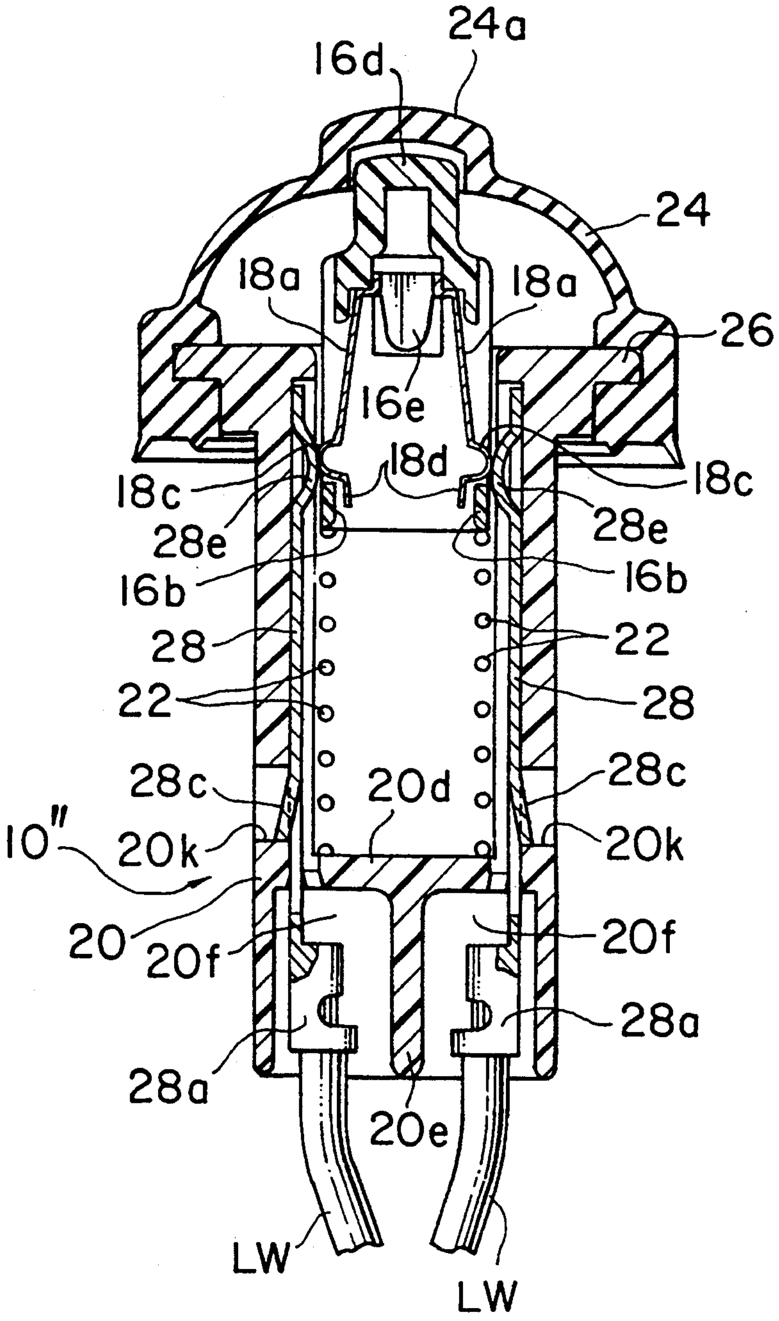
FIGS. 11 and 12 are cross-sectional elevational views of yet another embodiment of a push-button switch whereby the push-button assembly is shown in its extended and retracted conditions so as to respectively make and break an external electrical circuit.
Figure 12:
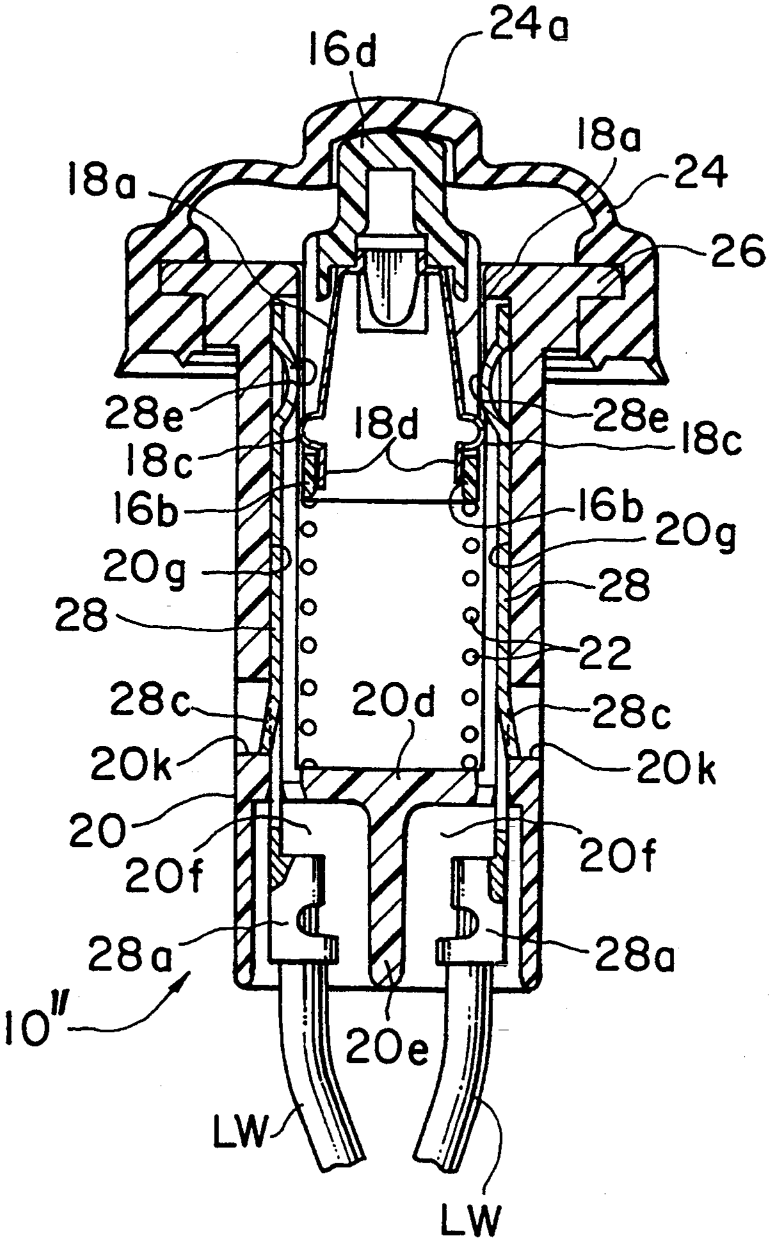

Accompanying FIGS. 11 and 12 show yet another embodiment of a push-button switch 10" according to this invention. As can be seen, the push-button switch 10" is substantially similar to the switch 10 discussed previously, with the principal exception being that no cover walls 20h are provided. In order to make and break contact between the fixed contact strips 28 and the curved contact regions 16c, however, the upper ends of the former include outwardly protruding bosses 28e. Thus, when in the push-button member 16 is in its extended position as shown in FIG. 11, contact will be made between the protruding bosses 28e and the curved contact regions 16c. On the other hand, when the push-button member 16 is moved into its retracted position as shown in FIG. 12, contact will be broken between the protruding bosses 28e and the curved contact regions 16c. Furthermore, contact between the curved contact portions and the contact strips 28 below the protruding bosses 28e is prevented when the push-button member is in its retracted position by virtue of the bridge walls 16b and terminal end flanges 18d limiting the extent of outward displacement of the resilient arms 18a.

The housing 20 has been shown and described as being a generally cylindrical tubular structure. However, other non-cylindrical cross-sections, for example, rectangular cross-sections, may be employed.

Thus, while the present invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A push-button switch comprising:

a housing defining an interior space and an opposed pair of longitudinally oriented recessed channels, at least an upper region of said recessed channels being open to said defined interior space;

a pair of elongate fixed contact strips positioned within a respective one of said defined recessed channels, said fixed contact strips being of a sufficient length so that a terminal end portion thereof is disposed in said open upper region of said recessed channel to thereby be exposed to said interior space of said housing;

a push-button assembly which is received within said interior space of said housing for reciprocal movements between extended and retracted positions; and a spring for urging said push-button assembly into said extended position; wherein said push button assembly includes a slide contact member which is movable with said push-button assembly between said extended and retracted positions thereof, said slide contact member having a pair of resilient contact legs each contacting a respective one of said exposed terminal end portions of said fixed contact strips when said push-button assembly is in said extended position, whereby an electrical circuit is made, and being spaced from said respective one of said fixed contact strips when said push-button assembly is in said retracted position, whereby an electrical circuit is broken, wherein each of said fixed contacts having a protruding boss formed on an upper end thereof, and wherein said resilient arms of said slide contact member have curved contact regions which contact a respective one of said bosses when said push-button assembly is in said extended position thereof, and wherein said push-button assembly includes a push-button member defining a pair of windows through which a respective one of said curved contact regions extends, and having bridge walls for establishing a lower extent of said windows, and wherein said resilient arms of said slide contact member includes terminal end flanges which contact said bridge walls to limit the extent of outward displacement of said resilient arms and thereby prevent contact between said curved contact regions and said fixed contact strips below said bosses when said push-button assembly is in said retracted position thereof.

2. A push-button switch as in claim 1, wherein said housing includes interior cover walls covering a major extent of said recessed channels so that said terminal end portions of said fixed contact strips positioned therewithin are exposed to said defined housing interior space.

3. A push-button switch as in claim 2, wherein said cover walls include upper beveled edges.

4. A push-button switch as in claim 1, wherein said housing includes a bottom wall which establishes a recessed pocket at a bottom end of said housing.

5. A push-button switch as in claim 4, wherein said bottom wall includes a transverse divider wall for subdividing said established pocket into at least one pair of subpockets.

6. A push-button switch as in claim 5, wherein said fixed contact strips include bottom clamp ends for connection to electrical lead wires associated with an electrical circuit, each of said bottom clamp ends being positioned within a respective one of said subpockets.

7. A push-button switch as in claim 1, wherein said push-button assembly includes a push-button member having a central guide post, and wherein said slide contact includes an annular collar which fits around said guide post.

8. A push-button switch as in claim 1, wherein said push button assembly includes a push-button member having a pair of retaining ledges, and wherein said slide contact includes a pair of resilient mounting ears each of which bears against a respective one of said retaining ledges and thereby couple said slide contact to said push-button actuator.

9. A push-button switch as in claim 1, wherein said housing includes a pair of opposed guide grooves, and wherein said push-button assembly includes a pair of opposed guide flanges positioned in said guide grooves for guiding said push-button assembly during movements between said extended and retracted positions thereof.

10. A push button switch as in claim 1, wherein said housing defines a pair of apertures, and wherein each said fixed contact strip includes a resilient locking tab which is positioned in a respective said aperture when said fixed contact strips are inserted into said housing.

11. A push-button switch comprising:

a housing defining interior space;

a pair of fixed contact members associated with said housing; and a push-button assembly movable within said interior space of said housing between extended and retracted positions, and including (a) a push-button member having a pair of interior retaining ledges; and (b) a slide contact member coupled within said push-button member for movements therewith between said extended and retracted positions;

(c) said slide contact member having a pair of resilient contact arms which make and break contact with respective ones of said fixed contact members in response to movement of said push-button assembly between said extended and retracted positions;

(d) said slide contact member also having a pair of resilient mounting ears which are seated with respective ones of said interior retaining ledges of said push-button member so as to couple said slide contact member to said push-button member, wherein each of said fixed contact strips having a protruding boss formed on an upper end thereof, and wherein said resilient arms of said slide contact member have curved contact regions which contact a respective one of said bosses when said push-button member is in said extended position thereof, and wherein said push-button member defines a pair of windows through which a respective one of said curved contact regions extends, and has bridge walls for establishing a lower extent of said windows, and wherein said resilient arms of said slide contact member includes terminal end flanges which contact said bridge walls to limit the extent of outward displacement of said resilient arms and thereby prevent contact between said curved contact regions and said fixed contact strips below said bosses when said push-button assembly is in said retracted position thereof.

12. A push-button switch as in claim 11, wherein said housing has a pair of opposed longitudinally oriented recessed channels in which respective ones of said fixed contact members are disposed.

13. A push-button switch as in claim 12, wherein said housing includes cover walls covering a major longitudinal extent of said recessed channels so that upper ends of said fixed contact members are exposed to said interior space of said housing.

14. A push-button switch as in claim 13, wherein said cover walls include upper beveled edges.

15. A push-button switch as in claim 11, wherein said housing includes a bottom wall which establishes a recessed pocket at a bottom end of said housing.

16. A push-button switch as in claim 11, wherein said bottom wall includes a transverse divider wall for subdividing said established pocket into at least one pair of subpockets.

17. A push-button switch as in claim 16, wherein said fixed contact strips include bottom clamp ends for connection to electrical lead wires associated with an electrical circuit, each of said bottom clamp ends being positioned within a respective one of said subpockets.

18. A push-button switch as in claim 11, wherein said push-button member having a central guide post, and wherein said slide contact includes an annular collar which fits around said guide post.

19. A push-button switch as in claim 11, wherein said housing includes a pair of opposed guide grooves, and wherein said push-button member includes a pair of opposed guide flanges positioned in said guide grooves for guiding said push-button member during movements between said extended and retracted positions thereof.

20. A push button switch as in claim 11, wherein said housing defines a pair of apertures, and wherein each said fixed contact strip includes a resilient locking tab which is positioned in a respective said aperture when said fixed contact strips are inserted into said housing.

* * * * *